US009274617B2

(12) United States Patent
Lee et al.

(10) Patent No.: US 9,274,617 B2
(45) Date of Patent: Mar. 1, 2016

(54) OPTICAL NAVIGATION APPARATUS CALCULATING AN IMAGE QUALITY INDEX TO DETERMINE A MATCHING BLOCK SIZE

(71) Applicant: PIXART IMAGING INC., Hsin-Chu (TW)

(72) Inventors: Yu-Ju Lee, Hsin-Chu (TW); Tzu-Yu Chen, Hsin-Chu (TW)

(73) Assignee: PIXART IMAGING INC (TW)

( * ) Notice: Subject to any disclaimer, the term of this patent is extended or adjusted under 35 U.S.C. 154(b) by 45 days.

(21) Appl. No.: 14/067,632

(22) Filed: Oct. 30, 2013

(65) Prior Publication Data
US 2014/0210725 A1 Jul. 31, 2014

(30) Foreign Application Priority Data

Jan. 31, 2013 (TW) .............................. 102103600 A

(51) Int. Cl.
*G06F 3/033* (2013.01)
*G06F 3/0354* (2013.01)
*G06F 3/03* (2006.01)
*G06T 7/20* (2006.01)

(52) U.S. Cl.
CPC .......... *G06F 3/03543* (2013.01); *G06F 3/0317* (2013.01); *G06T 7/2013* (2013.01); *G06T 2207/20008* (2013.01); *G06T 2207/30168* (2013.01)

(58) Field of Classification Search
CPC ...... G06F 3/0317; G06F 3/0321; G06F 3/033
USPC ................................................. 345/163–179
See application file for complete search history.

(56) References Cited

U.S. PATENT DOCUMENTS

| 2004/0095323 | A1* | 5/2004 | Ahn ............................... 345/166 |
| 2004/0160411 | A1* | 8/2004 | Yang .............................. 345/156 |
| 2005/0139944 | A1* | 6/2005 | Lin et al. ........................ 257/432 |
| 2005/0276509 | A1* | 12/2005 | Chou ............................. 382/275 |
| 2006/0022116 | A1* | 2/2006 | Wang ........................ 250/208.1 |
| 2006/0033014 | A1* | 2/2006 | Feldmeier et al. ............. 250/221 |
| 2006/0132443 | A1* | 6/2006 | Chien Wu ............. G06F 1/3215 345/166 |
| 2006/0209015 | A1 | 9/2006 | Feldmeier et al. |

(Continued)

FOREIGN PATENT DOCUMENTS

| CN | 102143378 A | 8/2011 |
| TW | 200634722 | 9/1994 |
| TW | 201122920 A1 | 7/2011 |

OTHER PUBLICATIONS

First Office Action for Taiwanese Application No. TW102103600, mailed Oct. 8, 2014, with English translation.

*Primary Examiner* — Alexander Eisen
*Assistant Examiner* — Nelson Lam
(74) *Attorney, Agent, or Firm* — Cantor Colburn LLP

(57) ABSTRACT

An optical navigation apparatus, an optical navigation method, and a non-transitory computer readable medium thereof are provided. The optical navigation apparatus includes a light source unit, an image sensing unit, and a processing unit. The processing unit is electrically connected to the light source unit and the image sensing unit. The light source unit provides a beam of light. The image sensing unit captures a first image at a first time instant when the light is projected onto a reflection surface. The processing unit calculates an image quality index of the first image and determines a matching block size between the first image and a second image according to the image quality index.

32 Claims, 8 Drawing Sheets

(56) References Cited

U.S. PATENT DOCUMENTS

| | | | |
|---|---|---|---|
| 2007/0215792 A1* | 9/2007 | Cheah et al. | 250/221 |
| 2007/0252814 A1* | 11/2007 | Lin et al. | 345/158 |
| 2007/0262243 A1* | 11/2007 | cheah et al. | 250/214 R |
| 2008/0048972 A1* | 2/2008 | Kakarala | 345/156 |
| 2008/0316174 A1* | 12/2008 | Mellot | 345/166 |
| 2009/0026351 A1* | 1/2009 | Itagaki | 250/206.1 |
| 2009/0146044 A1* | 6/2009 | Chen et al. | 250/201.1 |
| 2011/0150363 A1* | 6/2011 | Chen et al. | 382/291 |
| 2011/0181511 A1* | 7/2011 | Yang et al. | 345/158 |
| 2011/0310018 A1* | 12/2011 | Song et al. | 345/166 |
| 2012/0007834 A1* | 1/2012 | Chen et al. | 345/175 |
| 2012/0020520 A1* | 1/2012 | Lin et al. | 382/103 |
| 2012/0020529 A1* | 1/2012 | Chen et al. | 382/107 |
| 2012/0127077 A1* | 5/2012 | Chen et al. | 345/166 |
| 2013/0324190 A1* | 12/2013 | Ju et al. | 455/556.1 |
| 2014/0292657 A1* | 10/2014 | Chen et al. | 345/166 |
| 2015/0009146 A1* | 1/2015 | Song | 345/166 |

* cited by examiner

| Cor_0 | Cor_1 | Cor_2 | Cor_3 | Cor_4 |
|---|---|---|---|---|
| Cor_5 | Cor_6 | Cor_7 | Cor_8 | Cor_9 |
| Cor_10 | Cor_11 | Cor_12 | Cor_13 | Cor_14 |
| Cor_15 | Cor_16 | Cor_17 | Cor_18 | Cor_19 |
| Cor_20 | Cor_21 | Cor_22 | Cor_23 | Cor_24 |

OPTICAL NAVIGATION APPARATUS CALCULATING AN IMAGE QUALITY INDEX TO DETERMINE A MATCHING BLOCK SIZE

This application claims priority to Taiwan Patent Application No. 102103600 filed on Jan. 31, 2013, which is hereby incorporated by reference in its entirety.

CROSS-REFERENCES TO RELATED APPLICATIONS

Not applicable.

BACKGROUND OF THE INVENTION

1. Field of the Invention

The present invention provides an optical navigation apparatus, an optical navigation method, and a non-transitory computer readable medium thereof. More particularly, the present invention provides an optical navigation apparatus, an optical navigation method, and a non-transitory computer readable medium thereof that are capable of dynamically adjusting a matching block size.

2. Descriptions of the Related Art

Nowadays, computers have become indispensable to the modern person's lifestyle. For most conventional computers, computer mice are used as primary input devices. The computer user often needs to use a mouse to move a cursor displayed on a screen, or even use the mouse to click the desired options, applications, and so on. Therefore, the computer mice have become an important bridge for communication between users and computers. As a result, computer mice adopting various technologies have been developed by mouse manufacturers. Particularly, over recent years, optical navigation apparatuses have become available in the market; an example of which is the Optical Finger Mouse (OFM).

An optical navigation apparatus operates under the following principle: a beam of light is projected by a light source unit onto a reflection surface and images are captured by an image sensing unit. Images that are captured consecutively are compared by a processing unit to determine an offset of the optical navigation apparatus within a time interval. Then, the offset is used to control a cursor displayed on the screen for the purpose of navigation.

For conventional optical navigation apparatuses, movement detection is accomplished by using a predetermined matching block size (e.g., the length and the width of which are both 8 pixels) to compare consecutive images. The predetermined matching block size is invariable and unadjustable. In some cases, the images captured by the image sensing unit may be blurred due to factors, such as a poor working surface or defocusing. In such cases, a smaller predetermined matching block size will lead to an unsatisfactory navigation effect. However, if the predetermined matching block size is enlarged, then more resources of the optical navigation apparatus will be consumed during the comparison process.

Accordingly, an urgent need still exists in the art to provide an optical navigation technology capable of comparing images accurately and efficiently.

SUMMARY OF THE INVENTION

To solve the aforesaid problem, the present invention provides an optical navigation apparatus, an optical navigation method and a non-transitory computer readable medium thereof.

The optical navigation apparatus of the present invention comprises a light source unit, an image sensing unit and a processing unit. The processing unit is electrically connected to the light source unit and the image sensing unit. The light source unit is configured to provide a beam of light. The image sensing unit is configured to capture a first image at a first time instant when the beam of light is projected onto a reflection surface. The processing unit is configured to calculate an image quality index related to the first image and determine a matching block size related to the first image and a second image according to the image quality index.

The optical navigation method of the present invention is adapted to be used in an optical navigation apparatus. The optical navigation apparatus comprises a light source unit, an image sensing unit and a processing unit. The optical navigation method comprises the following steps: (a) capturing, by the image sensing unit, a first image at a first time instant when the light source unit projects a beam of light onto a reflection surface; (b) calculating, by the processing unit, an image quality index that is related to the first image; and (c) determining, by the processing unit, a first matching block size that is related to the first image and a second image according to the image quality index.

The non-transitory computer readable medium of the present invention has a computer program stored therein. The computer program executes an optical navigation method after being loaded into an optical navigation apparatus. The optical navigation apparatus comprises a light source unit, an image sensing unit, and a processing unit. The computer program comprises code A, code B, and code C. Code A is for capturing a first image at a time instant by the image sensing unit when the light source unit projects a beam of light onto a reflection surface. Code B is for calculating an image quality index that is related to the first image by the processing unit. Code C is for determining a matching block size that is related to the first image and a second image according to the image quality index by the processing unit.

The present invention can calculate an image quality index according to information from various images and then determines the matching block size for use in a subsequent comparing process according to the image quality index. When the images have better quality, a smaller matching block size is adopted because a better comparison effect can be obtained. In this way, the images can be compared efficiently. When the images have poorer quality, a larger matching block size is adopted to maintain a certain quality level of the comparison result. Accordingly, the optical navigation apparatus, optical navigation method, and non-transitory computer readable medium thereof of the present invention can not only compare images efficiently but can also provide a good comparison result.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, an optical navigation apparatus, an optical navigation method, and a non-transitory computer readable medium thereof according to the present invention will be explained with reference to embodiments thereof. However, these embodiments are not intended to limit the present invention to any environments, applications, or implementations described in these embodiments. Therefore, the description of these embodiments is only for the purpose of illustration rather than limitation. It shall be appreciated that in the following embodiments and attached drawings, elements not directly related to the present invention are omitted from depiction.

Figure 1A:
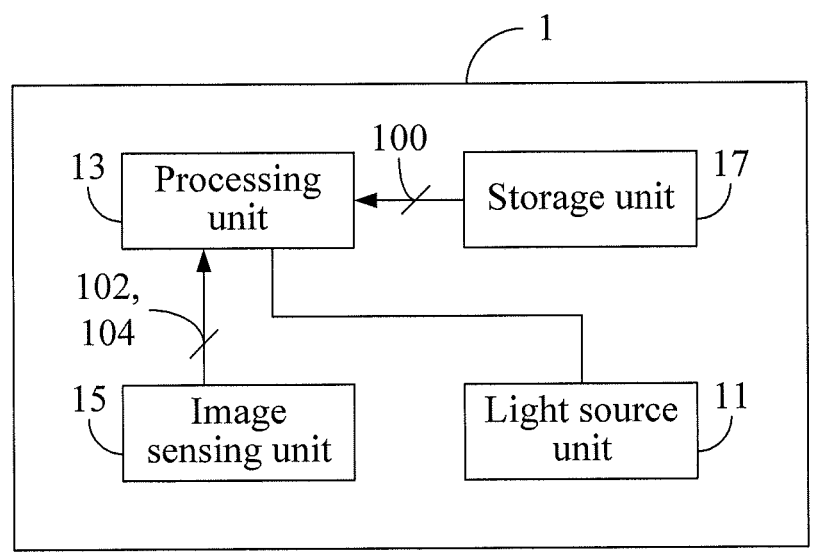
FIG. 1A is a schematic view depicting an optical navigation apparatus 1 of the first embodiment.

The first embodiment of the present invention is an optical navigation apparatus 1 and a schematic view of which is depicted in FIG. 1A. The optical navigation apparatus 1 comprises a light source unit 11, a processing unit 13, an image sensing unit 15, and a storage unit 17. The processing unit 13 is electrically connected to the light source unit 11, the image sensing unit 15, and the storage unit 17.

The light source unit 11 may be a light emitting diode (LED) or some other light source unit well known to those of ordinary skill in the art. The processing unit 13 may be any various processors, central processing units (CPUs), microprocessors, or other computing apparatuses that are well known to those of ordinary skill in the art. The image sensing unit 15 may be a complementary metal oxide semiconductor (CMOS) photosensitive unit or some other image sensing unit well known to those of ordinary skill in the art. The storage unit 17 may be of any various built-in memories or other storage media with the same function and well known to those of ordinary skill in the art.

Figure 1B:
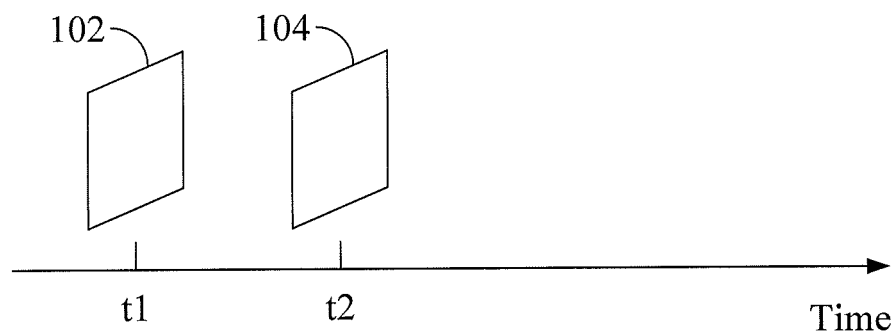
FIG. 1B is a schematic view depicting correlations between time instants t1, t2 and images 102, 104.

When the optical navigation apparatus 1 is powered on, the light source unit 11 generates a beam of light (not shown). When the beam of light is projected onto a reflection surface, the image sensing unit 15 sequentially captures images 102, 104 at time instants t1, t2 respectively, as shown in FIG. 1B. The following description will be made with reference to the time instants t1, t2 and the images 102, 104; however, it can be readily devised by those of ordinary skill in the art that the same technical means can be adopted by the optical navigation apparatus 1 to process images captured by the image sensing unit 15 at other time instants.

In this embodiment, after the image 104 is captured by the image sensing unit 15, the processing unit 13 calculates an image quality index related to the image 104 and determines a matching block size related to the image 102 and the image 104 according to the image quality index. Thereafter, the processing unit 13 calculates an offset of the optical navigation apparatus 1 within a time interval defined by the time instants t1, t2 by comparing the image 102 and the image 104 according to the matching block size, thereby, achieving the navigation effect. It shall be appreciated that the method in which the offset of the optical navigation apparatus 1 is determined by comparing the image 102 and the image 104; this is well known to those of ordinary skill in the art and is not essential to the present invention, and thus, will not be further described herein.

The method in which the image quality index is calculated and how it determines the matching block size according to the image quality index in this embodiment will be described in detail. In this embodiment, a luminance variation of the image 104 (e.g., a standard deviation of luminance values of all pixels within the image 104) is used as the image quality index. The storage unit 17 has a correspondence table 100 stored therein, which records matching block sizes corresponding to different image quality indices. After calculating the image quality index, the processing unit 13 determines the matching block size by querying the correspondence table 100.

Furthermore, when the luminance variation of the image 104 is large, there are a large number of features within the image 104. Under this circumstance, an accurate position can be easily determined by comparing the image 104 and the image 102 according to a small matching block size. On the contrary, when the luminance variation of the image 104 is small, there are only a small number of features within the image 104. Under this circumstance, a large matching block size must be used to compare the image 104 and the image 102 to increase the possibility of determining an accurate position. Accordingly, if a larger image quality index value is used to represent a larger luminance variation, then larger image quality index values will correspond to smaller matching block sizes in the correspondence table 100. On the contrary, if a larger image quality index is used to represent a smaller luminance variation, then larger image quality index values will correspond to larger matching block sizes in the correspondence table 100.

As can be known from the above description, the matching block size used for comparison between image 104 and image 102 is determined according to the luminance variation of the image 104 in the first embodiment. When the image 104 has good quality (i.e., contains a large number of features and has a large luminance variation), a small matching block size is used so that the image 104 and the image 102 can be compared more efficiently. When the image has poor quality (i.e., contains a small number of features and has a small luminance variation), a large matching block size is used to maintain a certain level of quality in the comparison result. Through the configuration and technology of the first embodiment, the optical navigation apparatus 1 can not only compare the images efficiently but can also provide a good comparison result.

FIGS. 1A and 1B will be referenced in a second embodiment of the present invention. The second embodiment differs from the first embodiment mainly in the adopted image quality index.

In this embodiment, after the image 104 is captured by the image sensing unit 15, the processing unit 13 firstly filters the image 104 into a filtered image (not shown). It shall be appreciated that for the filtered image that has been filtered by the processing unit 13, the larger the absolute value of a pixel value, the more obvious the features of the filtered image (e.g., the larger the luminance variation); and the smaller (i.e., the closer to 0) the absolute value of the pixel value, the less obvious the features of the filtered image. Next, the processing unit 13 calculates the image quality index related to the image 104 according to the filtered image. This embodiment provides multiple ways of calculating the image quality index according to the filtered image for option, which will be respectively described as follows.

In the first way, the processing unit 13 takes absolute values of all the pixel values of the filtered image, and sums those of the absolute values greater than a threshold to obtain a sum value as the image quality index. In a second way, the processing unit 13 takes the absolute values of all the pixel values of the filtered image, and calculates a total number of those of the absolute values greater than the threshold as the image quality index. In a third way, the processing unit 13 uses a standard deviation of all the pixel values of the filtered image as the image quality index.

No matter which of the ways described in the last paragraph is adopted, a larger image quality index represents that an accurate position can be easily determined even if a smaller matching block size is adopted to compare the image 104 and the image 102. On the contrary, a smaller image quality index represents that a larger matching block size must be adopted to compare the image 104 and the image 102 to increase the possibility of determining an accurate position. Therefore, larger image quality index values correspond to smaller matching block sizes but smaller image quality index values correspond to larger matching block sizes in the correspondence table 100.

Similar to the first embodiment, the storage unit 17 has a correspondence table 100 stored therein, which records matching block sizes corresponding to different image quality indices. After calculating the image quality index, the processing unit 13 determines the matching block size by querying the correspondence table 100. It shall be appreciated that when the image quality index is calculated in different ways, the contents of the correspondence table 100 used correspondingly will vary to appropriately reflect the relationships between the image quality index and the matching block size.

As can be known from the above description, the second embodiment calculates the image quality index according to the filtered image of the image 104 and determines the appropriate matching block size according to the image quality index. Therefore, through the configuration and the technology of the second embodiment, the optical navigation apparatus 1 can not only compare the images efficiently but can also provide a good comparison result.

Figure 2A:
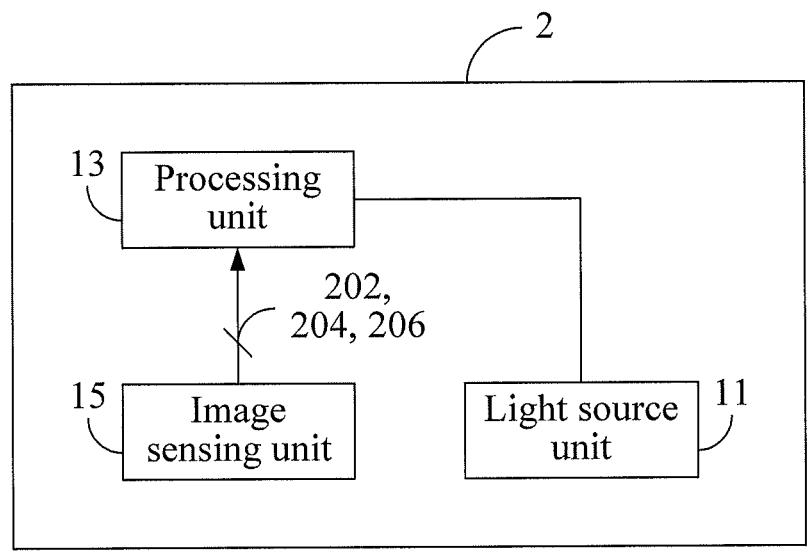
FIG. 2A is a schematic view depicting an optical navigation apparatus 2 of the third embodiment.

A third embodiment of the present invention is an optical navigation apparatus 2, in which a schematic view is depicted in FIG. 2A. The optical navigation apparatus 2 comprises a light source unit 11, a processing unit 13, and an image sensing unit 15. The processing unit 13 is electrically connected to the light source unit 11 and the image sensing unit 15. The operations of the light source unit 11, the processing unit 13, and the image sensing unit 15 in the third embodiment are similar to those in the first embodiment and the second embodiment, so only differences therebetween will be described in detail hereinafter.

Figure 2B:
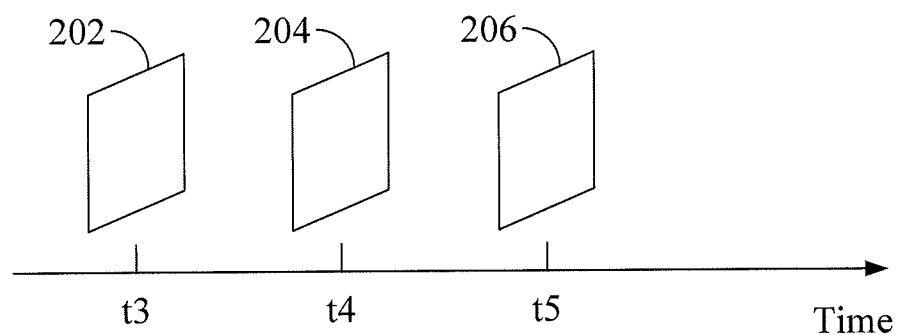
FIG. 2B is a schematic view depicting correlations between time instants t3, t4, t5 and images 202, 204, 206.

In this embodiment, when the beam of light is projected onto a reflection surface, the image sensing unit 15 sequentially captures images 202, 204, 206 at time instants t3, t4, t5 respectively, as shown in FIG. 2B. The following description will be made with reference to the time instants t3, t4, t5 and the images 202, 204, 206; however, it can be readily devised by those of ordinary skill in the art that the same technical means can be adopted by the optical navigation apparatus 2 to process images captured by the image sensing unit 15 at other time instants.

In brief, after the image 204 is captured by the image sensing unit 15, the processing unit 13 calculates an image quality index related to the image 204 and determines a matching block size related to the image 204 and the image 206 according to the image quality index. Thereafter, the processing unit 13 calculates an offset of the optical navigation apparatus 2 within a time interval defined by the time instants t4, t5 by comparing the image 204 and the image 206 according to the matching block size, thereby, achieving the navigation effect.

Figures 2C, 3:
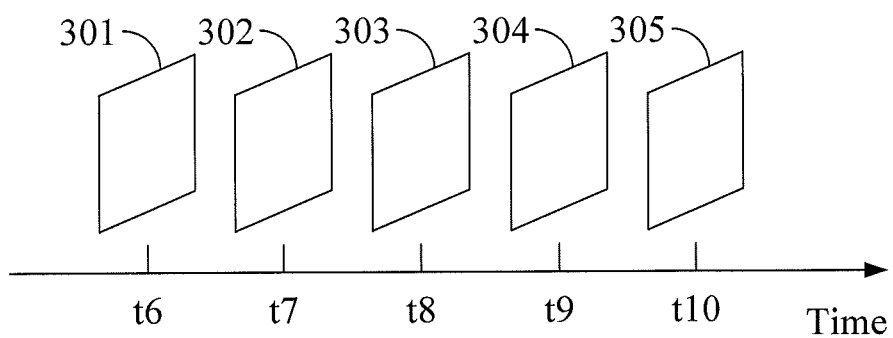
FIG. 2C is a schematic view depicting a plurality of correlation values of the third embodiment.
FIG. 3 is a schematic view depicting correlations between time instants t6, t7, t8 t9, t10 and images 301, 302, 303, 304, 305.

Now, the method in which the image quality index related to the image 204 is calculated in this embodiment will be detailed first. Specifically, the processing unit 13 compares the image 202 and the image 204 according to a predetermined matching block size (i.e., the matching block size for comparing between the image 202 and the image 204 and whose length and width are both assumed to be 8 pixels) to calculate an offset of the optical navigation apparatus 2 within a time interval defined by the time instants t3, t4. When image 202 and image 204 are compared, the processing unit 13 calculates a plurality of correlation values Cor_0~Cor_24 between the image 202 and the image 204 within a search range (e.g., a search range of 5-pixel length and 5-pixel width), as shown in FIG. 2C. The correlation values Cor_0~Cor_24 represent correlation degrees between sub-images (the size of which is the same as the matching block size, i.e., both the length and the width are 8 pixels) of the image 202 and the image 204 when the image 202 and the image 204 have different offsets therebetween. For example, the correlation value Cor_12 represents a correlation degree between sub-images of the image 202 and the image 204 when the offset between the image 202 and the image 204 is 0. For example, according to some ways of calculating the correlation value, the larger the correlation value, the higher the similarity between the sub-images. On the contrary, according to some other ways of calculating the correlation value, the smaller the correlation value, the higher the similarity between the sub-images. It shall be appreciated that the method for calculating the correlation values Cor_0~Cor_24 between the image 202 and the image 204 is well known to those of ordinary skill in the art, and thus, will not be further described herein.

Next, the processing unit 13 determines the image quality index that is related to the image 204 according to the correlation values Cor_0~Cor_24. For convenience of subsequent descriptions, the following case will be firstly described: the larger the correlation values Cor_0~Cor_24, the higher the similarity between the sub-images. This embodiment provides multiple ways of calculating the image quality index according to the correlation values Cor_0~Cor_24 for options.

In the first way, the processing unit 13 selects a maximum value from the correlation values Cor_0~Cor_24 as the image quality index. In the second way, the processing unit 13 firstly selects a maximum value (e.g., the correlation value Cor_8) from the correlation values Cor_0~Cor_24, calculates an average value of the eight correlation values Cor_2, Cor_3, Cor_4, Cor_7, Cor_9, Cor_12, Cor_13, Cor_14 around the maximum value, and then takes an absolute value of a result of subtracting the average value from the maximum value as the image quality index. In the third way, all the correlation values Cor_0~Cor_24 must be nonnegative numbers. The processing unit 13 selects a maximum value from the correlation values Cor_0~Cor_24, calculates an average value of the eight correlation values around the maximum value, and divides the maximum value by the average value to obtain a value as the image quality index. If the average value is 0, the processing unit 13 uses a preset upper limit value as the image quality index and this represents a good image quality.

In the fourth way, the processing unit 13 firstly selects a maximum value (e.g., the correlation value Cor_8) from the correlation values Cor_0~Cor_24, selects another maximum value (e.g., the correlation value Cor_21) from other correlation values Cor_0, Cor_1, Cor_5, Cor_6, Cor_10, Cor_11, Cor_15~Cor_24 that excludes the maximum value and the eight correlation values Cor_2, Cor_3, Cor_4, Cor_7, Cor_9, Cor_12, Cor_13, Cor_14 around the maximum value, and takes an absolute value of a result of subtracting the another maximum value from the maximum value as the image quality index. In the fifth way, all the correlation values Cor_0~Cor_24 must be nonnegative numbers. The processing unit 13 firstly selects a maximum value from the correlation values Cor_0~Cor_24, selects another maximum value from other correlation values than the maximum value and the eight correlation values around the maximum value, and divides the maximum value by another maximum value to obtain a value as the image quality index. If another maximum value is 0, the processing unit 13 uses a preset upper limit value as the image quality index and this represents a good image quality. In the sixth way, the processing unit 13 selects a maximum value from the correlation values Cor_0~Cor_24, selects a maximum value from the correlation values of the previous stage, and subtracts the maximum value of the previous stage from the maximum value of this stage to obtain a value as the image quality index.

If the image quality index is determined in any of the first to the sixth ways described above, then the larger the image quality index, the better the quality of the image 204, and thus, the more credible the comparison result obtained.

Now, the following case will be described: the smaller the correlation values Cor_0~Cor_24, the higher the similarity between the sub-images. In this case, the step of selecting the maximum value must be replaced by a step of selecting the minimum value when the image quality index is determined in any of the first to the sixth ways described above. If the image quality index is determined in any of the above first, the third, the fifth, and the sixth ways, then, the smaller the image quality index, the better the quality of the image 204 and thus, the more credible the comparison result that is obtained. If the image quality index is determined in the aforesaid sixth way, then, the smaller the image quality index, the poorer the quality of the image 204 and thus, the more incredible the comparison result obtained.

Next, the ways for determining the matching block size for the next stage according to the image quality index in this embodiment will be detailed. Now, the case where the larger image quality index represents the better quality of the image 204 will be described first. In this embodiment, various adjustment approaches are provided to determine/adjust the matching block size.

The first adjustment approach is now described. The processing unit 13 sets a first threshold and a second threshold and compares the image quality index with the first threshold and/or the second threshold, wherein the first threshold is greater than the second threshold. If it is determined that the image quality index is greater than the first threshold, the processing unit 13 reduces the matching block size. This represents that the matching block size currently used is sufficient to allow for accurate comparison between two sub-images, so the matching block size can be reduced to increase the comparison efficiency. If it is determined that the image quality index is between the first threshold and the second threshold, the processing unit 13 will not adjust the matching block size. It means that using the current matching block size for comparing two sub-images will have a generally acceptable result, so the matching block size will not be adjusted. If it is determined that the image quality index is smaller than the second threshold, the processing unit 13 enlarges the matching block size. That is, the matching block size currently used is insufficient to allow for the accurate comparison between two sub-images, so the matching block size can be enlarged to obtain a good comparison result.

The second adjustment approach is based on the first adjustment method and further comprises a step of comparing the matching block size with an upper limit and a lower limit. Specifically, when it is determined that the image quality index is greater than the first threshold, the processing unit 13 further determines whether the matching block size is greater than a third threshold (e.g., both the length and the width being 4 pixels). The third threshold may be viewed as the lower limit of the matching block size. Only if the matching block size is greater than the third threshold, the processing unit 13 reduces the matching block size. This can prevent the matching block size from being reduced without limit. Likewise, when it is determined that the image quality index is smaller than the second threshold, the processing unit 13 further determines whether the matching block size is smaller than a fourth threshold (e.g., both the length and the width being 16 pixels). The fourth threshold may be viewed as the upper limit of the matching block size. The processing unit 13 will enlarge the matching block size only if the matching block size is smaller than the fourth threshold. Similarly, this can prevent the matching block size from being enlarged without limit, which would otherwise consume too many operation resources.

The third adjustment approach is also based on the first adjustment method and further comprises a step of determining the reduction evaluation count and the enlargement evaluation count. The reduction evaluation count represents a number of consecutive images that are determined as having the need of reducing the matching block size and has a preset value of 0. The enlargement evaluation count represents a number of consecutive images that are determined as having the need of enlarging the matching block size and also has a preset value of 0. Specifically, when it is determined that the image quality index is greater than the first threshold, the processing unit 13 increases the reduction evaluation count and then determines whether the reduction evaluation count is greater than a fifth threshold. If the reduction evaluation count is greater than the fifth threshold, meaning that the matching block size does have to be reduced, then the processing unit 13 reduces the matching block size and then restores the reduction evaluation count to zero. Likewise, if it is determined that the image quality index is smaller than the second threshold, then the processing unit 13 increases the enlargement evaluation count and further determines whether the enlargement evaluation count is greater than the sixth threshold. If the enlargement evaluation count is greater than the sixth threshold, meaning that the matching block size does have to be enlarged, then the processing unit 13 enlarges the matching block size and then restores the enlargement evaluation count to zero.

If the consecutive determination results of reducing the matching block size are interrupted (i.e., the previous consecutive images are determined to need a reduction of the matching block size, but the current image is determined to need no reduction of the matching block size) in the operating mechanism of the third adjustment method, then the reduction evaluation count will be restored to zero. Similarly, if the consecutive determination results of enlarging matching block size are interrupted, then the enlargement evaluation count will also be restored to zero. In the third adjustment method, the processing unit 13 will enlarge (or reduce) the matching block size only when multiple consecutive images are determined to need enlargement (or reduction) of the matching block size to prevent false determination and/or too frequent of an adjustment of the matching block size.

The fourth adjustment approach combines the second adjustment method with the third adjustment method, i.e., the matching block size will not be enlarged or reduced until three determination conditions are satisfied. Specifically, when it is determined that the image quality index is greater than the first threshold, the processing unit 13 further determines whether the matching block size is greater than the third threshold (i.e., the lower limit of the matching block size). When the matching block size is greater than the third threshold, the processing unit 13 further determines whether the reduction evaluation count is greater than the fifth threshold. If the reduction evaluation count is greater than the fifth threshold, this means that the matching block size needs to be reduced and, correspondingly, the processing unit 13 reduces the matching block size and then restores the reduction evaluation count to zero. The executing orders of determining whether the matching block size is greater than the third threshold and the step of determining whether the reduction evaluation count is greater than the fifth threshold may be exchanged.

Similarly, when the image quality index is determined to be smaller than the second threshold, the processing unit 13 further determines whether the matching block size is smaller than the fourth threshold (i.e., the upper limit of the matching block size). When the matching block size is smaller than the fourth threshold, the processing unit 13 further determines whether the enlargement evaluation count is greater than the sixth threshold. If the enlargement evaluation count is greater than the sixth threshold, this means the matching block size needs to be enlarged and, correspondingly, the processing unit 13 enlarges the matching block size and then restores the enlargement evaluation count to zero. The determination of whether the matching block size is smaller than the fourth threshold and whether the enlargement evaluation count is greater than the sixth threshold may be exchanged.

As described above, in some cases, a smaller image quality index represents a better quality of the image 204. Now, the method in which the matching block size is to be used at the next stage according to the image quality index in such a case will be described. Specifically, the processing unit 13 slightly changes the first to the third adjustment methods as follows: when it is determined that the image quality index is greater than the first threshold, the processing unit 13 changes to enlarge the matching block size instead; and when it is determined that the image quality index is smaller than the second threshold, the processing unit 13 changes to reduce the matching block size instead. Based on the explanation of the first to third adjustment method, those of ordinary skill in the art can change the first to the third adjustment method to be suitable for use in the case where a smaller image quality index represents better quality of the image 204, and thus, will not be further described herein.

Subsequently, after the image 206 is captured by the image sensing unit 15, the processing unit 13 can compare the image 204 and the image 206 according to the matching block size determined by the images 202, 204. Thus, an offset of the optical navigation apparatus 2 within a time interval defined by the time instants t4, t5 can be calculated to achieve the navigation effect.

As can be known from the above description, the third embodiment calculates the image quality index according to the correlation values generated during the comparison of the images 202, 204 and determines the matching block size to be used in comparison (i.e., comparison of the images 204, 206) of a next stage according to the image quality index. Through the configuration and the technology of the third embodiment, the optical navigation apparatus 2 can not only compare the images efficiently but can also provide a good comparison result.

FIGS. 2A and 3 illustrate the fourth embodiment of the present invention. The fourth embodiment differs from the third embodiment mainly in the adopted image quality index.

In this embodiment, the image sensing unit 15 sequentially captures images 301, 302, 303, 304, 305 at time instants t6, t7, t8, t9, t10 respectively when the beam of light is projected onto a reflection surface, as shown in FIG. 3. After the image 304 is captured by the image sensing unit 15, the processing unit 13 calculates an image quality index related to image 304 and determines a matching block size related to the image 304 and the image 305 according to the image quality index.

Herein, suppose that the processing unit 13 has calculated offsets of the optical navigation apparatus 2 between the time instants t6, t7, between the time instants t7, t8, and between the time instants t8, t9. This embodiment provides multiple ways of calculating the image quality index according to the aforesaid offsets for option, which will be respectively described as follows.

In the first way, the processing unit 13 calculates an average value of the offsets of the optical navigation apparatus 2 between the time instants t6, t7, between the time instants t7, t8, and between the time instants t8, t9, and uses the average value as the image quality index of image 305. In a second way, the processing unit 13 directly uses the offset of the optical navigation apparatus 2 between the time instants t7, t8 as the image quality index of the image 305. In the third way, the processing unit 13 takes a linear combination value of an x-axis component and a y-axis component of the offset of the optical navigation apparatus 2 between the time instants t7, t8 as the image quality index of the image 305.

The larger the image quality index determined in the aforesaid way, the higher the speed at which the optical navigation apparatus 2 is moved. When the moving speed is high, a small matching block size is needed to detect a large offset. On the contrary, the smaller the image quality index, the lower the speed at which the optical navigation apparatus 2 is moved. When the moving speed is slow, a large matching block size can be adopted to detect changes of the offset and to achieve a good comparison quality. The processing unit 13 can determine the matching block size related to the image 304 and the image 305 in any of the adjustment methods described in the third embodiments. Subsequently, after the image 305 is captured by the image sensing unit 15, the processing unit 13 can compare the image 304 and the image 305 according to the matching block size determined by the images 304, 305. Thus, an offset of the optical navigation apparatus 2 within a time interval defined by the time instants t9, t10 can be calculated to achieve the navigation effect.

As can be known from the above description, the fourth embodiment calculates the image quality index according to an offset between different images and then determines the matching block size to be used in comparison (i.e., comparison of the images 304, 305) of a next stage according to the image quality index. Through the configuration and the technology of the fourth embodiment, the optical navigation apparatus 2 can not only compare the images efficiently but can also provide a good comparison result.

Figure 4:
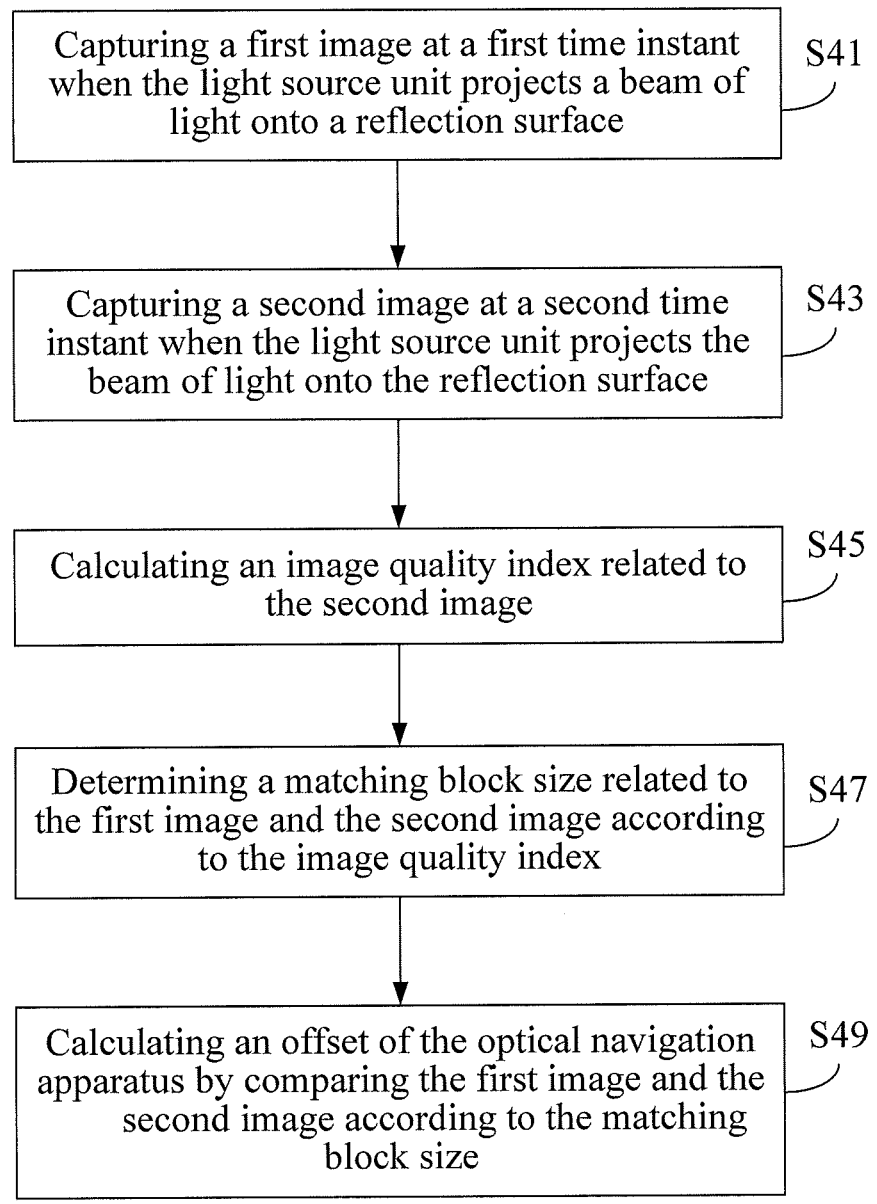
FIG. 4 is a flowchart diagram depicting the fifth embodiment of the present invention.

The fifth embodiment of the present invention is an optical navigation method, a flowchart diagram of which is depicted in FIG. 4. The optical navigation method is adapted to be used in an optical navigation apparatus (e.g., the optical navigation apparatus 1 of the first embodiment and the second embodiment). The optical navigation apparatus comprises a light source unit, an image sensing unit, and a processing unit.

First, step S41 is executed to capture, by the image sensing unit, a first image at a first time instant when the light source unit projects a beam of light onto a reflection surface. Then, step S43 is executed to capture, by the image sensing unit, a second image at a second time instant when the light source unit projects the beam of light onto the reflection surface. It shall be appreciated that the first time instant is earlier than the second time instant.

Step S45 is executed to calculate, by the processing unit, an image quality index related to the second image. In some implementations, step S45 is executed to calculate, by the processing unit, a luminance variation of the second image (e.g., a standard deviation of luminance values of all pixels within the second image) for use as the image quality index. Moreover, in some other implementations, step S45 is executed to filter the second image into a filtered image and calculate the image quality index according to the filtered image by the processing unit.

Step S47 is executed to determine, by the processing unit, a matching block size related to the first image and the second image according to the image quality index. For example, step S47 may be executed to query a correspondence table by the image quality index and set the matching block size according to the query result by the processing unit. Thereafter, step S49 is executed to calculate, by the processing unit, an offset of the optical navigation apparatus by comparing the first image and the second image according to the matching block size.

In addition to the aforesaid steps, the fifth embodiment can also execute all the operations and functions set forth in the first and the second embodiments. The method in which the fifth embodiment executes these operations and functions can be readily appreciated by those of ordinary skill in the art based on the explanation of the first and the second embodiments, and thus, will not be further described herein.

Figure 5A:
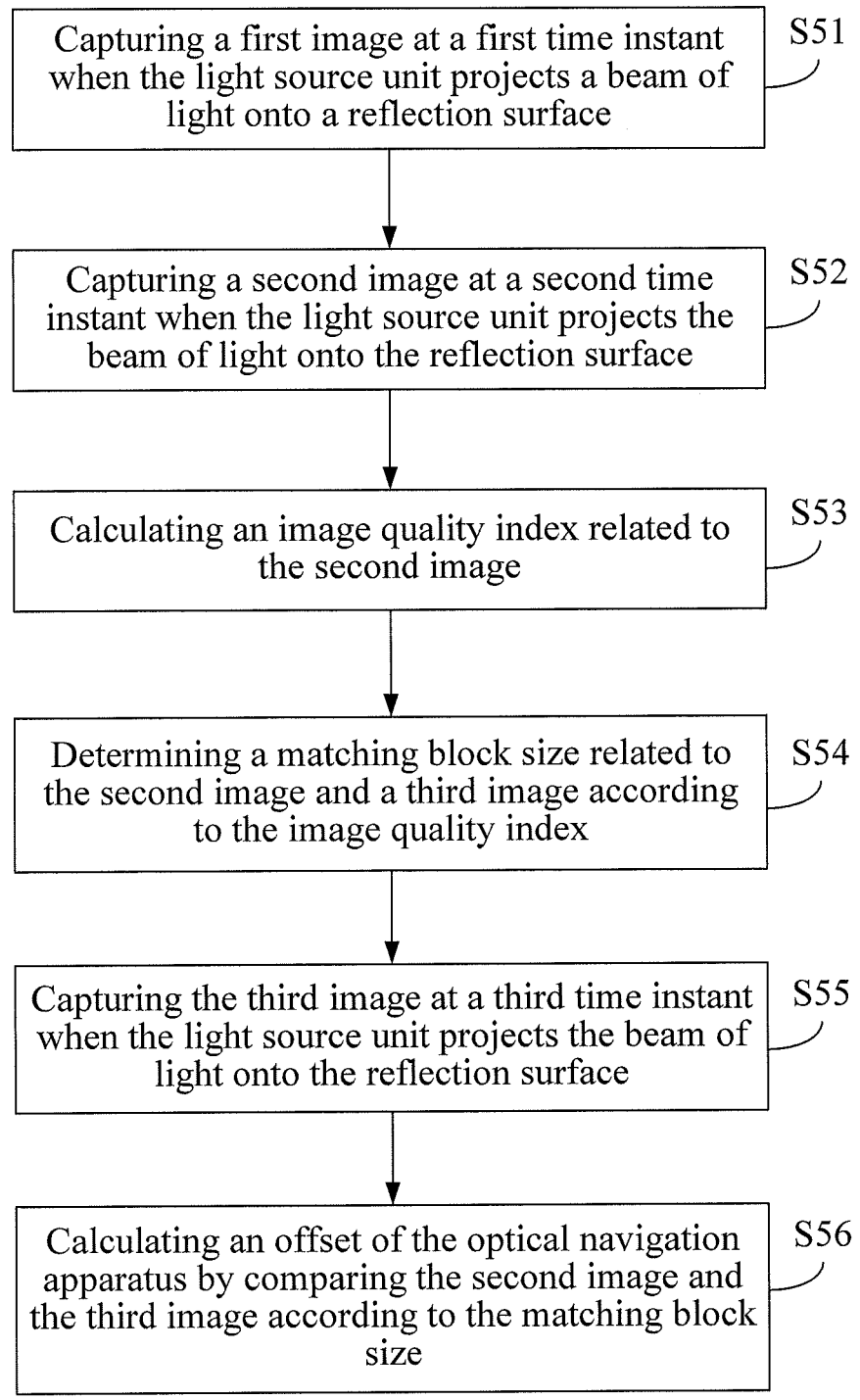
FIG. 5A is a main flowchart diagram depicting the sixth embodiment of the present invention.

The sixth embodiment of the present invention is an optical navigation method, a main flowchart diagram of which is depicted in FIG. 5A. The optical navigation method is adapted to be used in an optical navigation apparatus (e.g., the optical navigation apparatus 2 of the third embodiment and the fourth embodiment). The optical navigation apparatus comprises a light source unit, an image sensing unit and a processing unit.

First, step S51 is executed to capture, by the image sensing unit, the first image at the first time instant when the light source unit projects a beam of light onto a reflection surface. Then, step S52 is executed to capture, by the image sensing unit, the second image at the second time instant when the light source unit projects the beam of light onto the reflection surface. It shall be appreciated that the first time instant is earlier than the second time instant.

Step S53 is executed to calculate, by the processing unit, an image quality index related to the second image. In some implementations, step S53 is executed to calculate a plurality of correlation values between the first image and the second image according to a matching block size and determine the image quality index according to the correlation values by the processing unit. Moreover, in some other implementations, step S53 is executed to calculate a plurality of correlation values between the first image and the second image according to a matching block size, determine an offset between the first image and the second image according to the correlation values, and calculate the image quality index according to the offset by the processing unit.

In this embodiment, it is supposed that the larger image quality index represents a better quality of the image. Then, step S54 is executed to determine, by the processing unit, a matching block size relating to the second image and third image according to the image quality index. Thereafter, step S55 is executed to capture, by the image sensing unit, the third image at a third time instant when the light source unit projects the beam of light onto the reflection surface, with the third time instant being later than the second time instant. Finally, step S56 is executed to calculate, by the processing unit, an offset of the optical navigation apparatus by comparing the second image and the third image according to the matching block size.

Figure 5B:
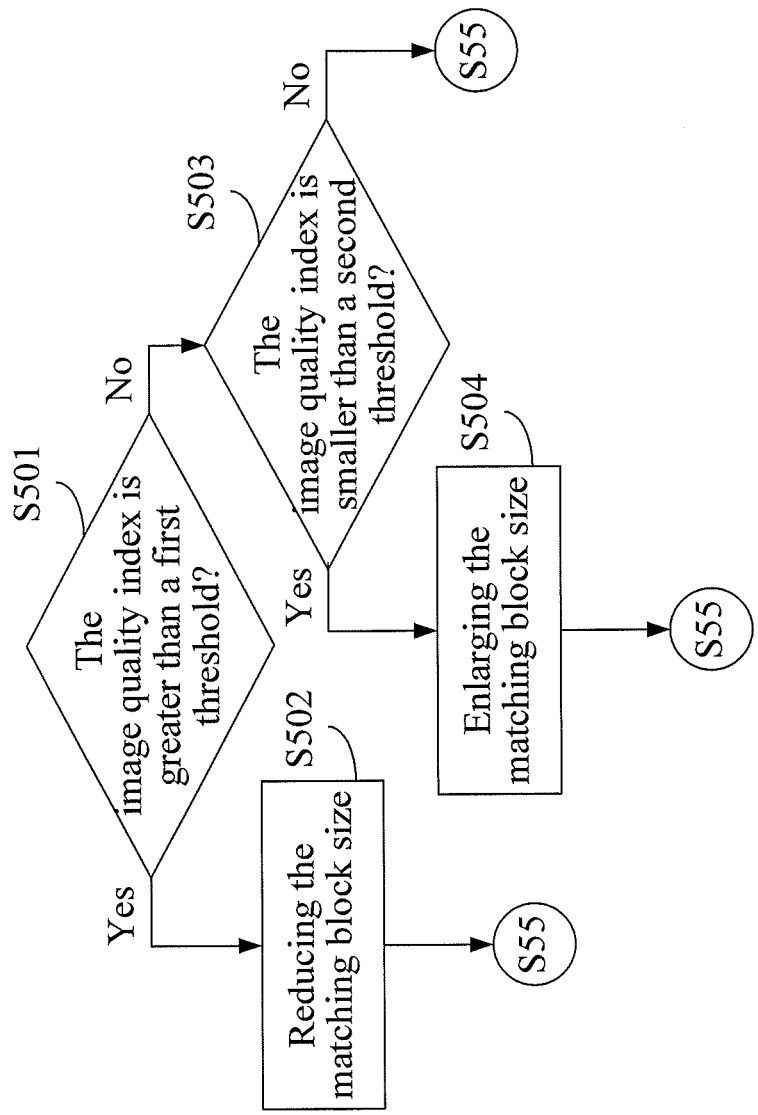
FIG. 5B is a first detailed flowchart diagram depicting step S54.
Figure 5C:
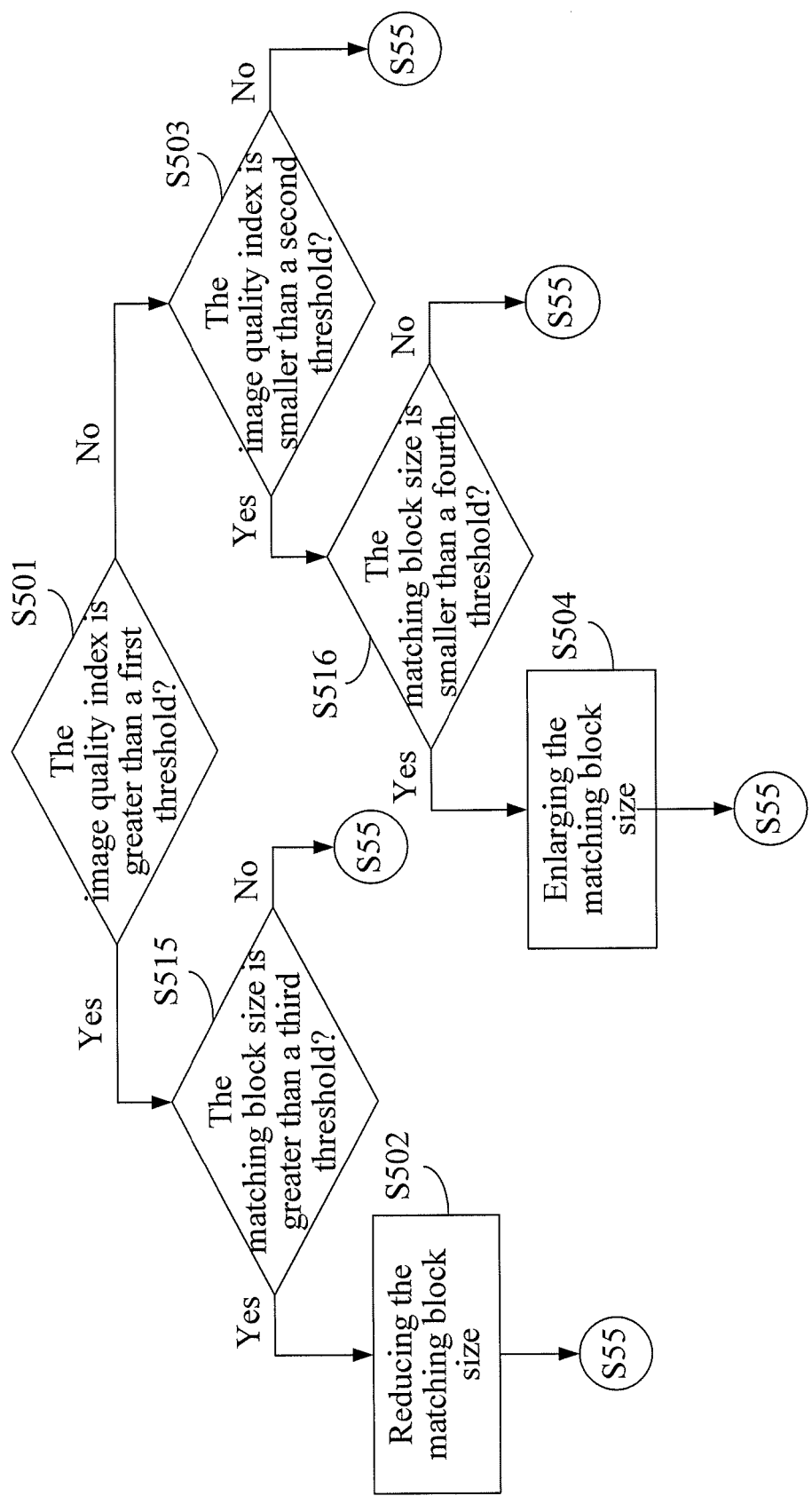
FIG. 5C is a second detailed flowchart diagram depicting step S54.
Figure 5D:
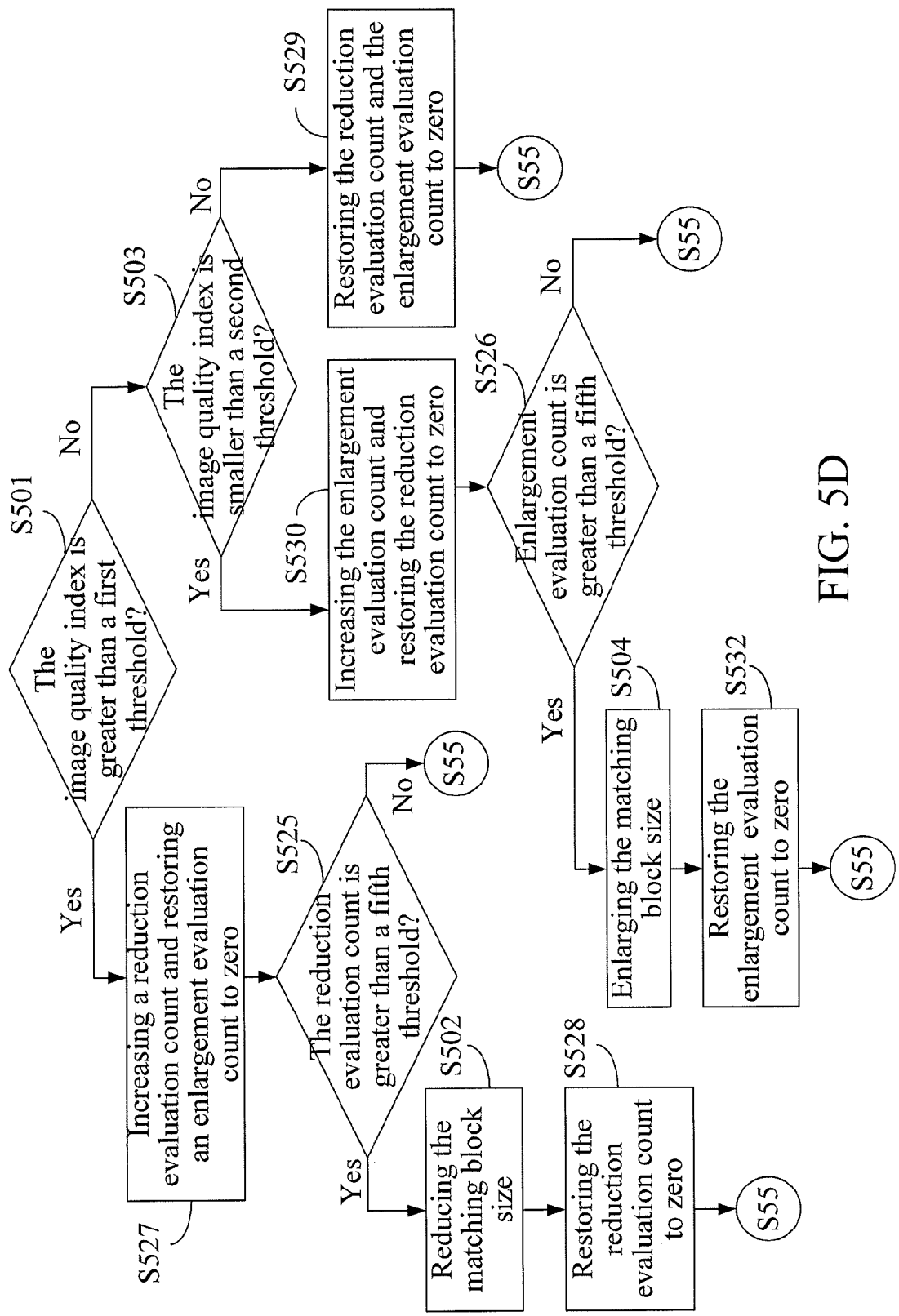
FIG. 5D is a third detailed flowchart diagram depicting step S54.

It shall be appreciated that the fifth embodiment provides three different ways to execute the step S54, which are depicted in FIG. 5B, FIG. 5C and FIG. 5D respectively for optional use.

In the way depicted in FIG. 5B, step S501 is first executed by the optical navigation apparatus to determine whether the image quality index is greater than the first threshold. This step may be understood as determining whether the image quality is higher than the preset upper limit. If the answer is "yes", then step S502 is executed to reduce the matching block size and thereafter, step S55 is executed. If it is determined in step S501 that the image quality index is no greater than the first threshold, then step S503 is executed to determine whether the image quality index is smaller than the second threshold. Step S503 may be understood as determining whether the image quality is lower than the preset lower limit. If the determination result of the step S503 is "yes", then step S504 is executed to enlarge the matching block size and thereafter, step S55 is executed. If the determination result of the step S503 is "no", then step S55 is executed directly.

In the way depicted in FIG. 5C, step S501 is firstly executed by the optical navigation apparatus to determine whether the image quality index is greater than the first threshold. If the answer is "yes", then step S515 is executed to determine whether the matching block size is greater than the third threshold. Step S515 may be understood as determining whether the matching block size is still greater than the lower limit of the block size. If the determination result of the step S515 is "yes", then step S502 is executed to reduce the matching block size and thereafter, step S55 is executed. If the determination result of the step S515 is "no", then step S55 is executed directly. On the other hand, if the result of the step S501 is "no", then step S503 is executed to determine whether the image quality index is smaller than the second threshold. If the determination result of the step S503 is "no", then step S55 is executed directly. If the determination result of the step S503 is "yes", then step S516 is further executed to determine whether the matching block size is smaller than the fourth threshold. Step S516 may be understood as determining whether the matching block size is still smaller than the upper limit of the block size. If the determination result of the step S516 is "yes", then step S504 is executed to enlarge the matching block size and thereafter, step S55 is executed. If the determination result of the step S516 is "no", then step S55 is executed directly.

In the way depicted in FIG. 5D, step S501 is firstly executed by the optical navigation apparatus to determine whether the image quality index is greater than the first threshold. If the answer is "yes", then step S527 is firstly executed to increase a reduction evaluation count and restore an enlargement evaluation count to zero and step S525 is then executed to determine whether the reduction evaluation count is greater than the fifth threshold. Step S525 may be understood as consecutively determining whether the count of needing to reduce the matching block size reaches a predetermined standard. If the determination result of the step S525 is "yes", then step S502 is executed to reduce the matching block size, step S528 is then executed to restore the reduction evaluation count to zero and thereafter, step S55 is executed. If the determination result of the step S525 is "no", then step S55 is executed directly.

On the other hand, if the result of the step S501 is "no", then step S503 is executed to determine whether the image quality index is smaller than the second threshold. If the determination result of the step S503 is "no", then step S529 is firstly executed to restore the reduction evaluation count and the enlargement evaluation count to zero and step S55 is then executed. If the determination result of the step S503 is "yes", then step S530 is firstly executed to increase the enlargement evaluation count and restore the reduction evaluation count to zero. Thereafter, step S526 is further executed to determine whether the enlargement evaluation count is greater than the fifth threshold. Step S526 may be understood as consecutively determining whether the count of needing to increase the matching block size reaches a predetermined standard. If the determination result of the step S526 is "yes", then step S504 is executed to enlarge the matching block size, step S532 is then executed to restore the enlargement evaluation count to zero and thereafter, step S55 is executed. If the determination result of the step S526 is "no", then step S55 is executed directly.

In other implementations, step S54 may also be accomplished through the combination of the process flows depicted in FIGS. 5C and 5D. Specifically, steps S501, S503, S515 and S516 of FIG. 5C are executed in the process of determining the matching block size. However, if the determination result of the step S515 is "yes", then step S527 of FIG. 5D is executed. Similarly, if the determination result of the step S516 is "yes", then step S530 of FIG. 5D is executed.

In addition to the aforesaid steps, the sixth embodiment can also execute all of the operations and functions set forth in the third and the fourth embodiments. The method in which the sixth embodiment executes these operations and functions can be readily appreciated by those of ordinary skill in the art based on the explanation of the third and the fourth embodiments, and thus, will not be further described herein.

Furthermore, the optical navigation method described in the fifth and the sixth embodiments may be implemented by a non-transitory computer readable medium. When the non-transitory computer readable medium is loaded into an optical navigation apparatus and a plurality of codes comprised therein is executed, the optical navigation method described in the fifth and the sixth embodiments can be accomplished. The aforesaid non-transitory computer readable medium may be a file capable of being transmitted in a network, and may also be stored in a computer readable medium such as a read only memory (ROM), a flash memory, a floppy disk, a hard disk, a compact disk, a mobile disk, a magnetic tape, a database accessible to networks, or any other storage media with the same function and well known to those skilled in the art.

As can be known from the descriptions of the aforesaid embodiments, the present invention can calculate an image quality index according to various information of images, and then determine a matching block size for use in a subsequent comparing process according to the image quality index. Because a better comparison effect can be obtained when the images have better quality, a smaller matching block size is adopted so that the images can be compared efficiently. When the images have poorer quality, a larger matching block size is adopted to maintain a certain level of a comparison result. Accordingly, the optical navigation apparatus, the optical navigation method and the non-transitory computer readable medium thereof of the present invention can not only compare images efficiently but can also provide a good comparison result.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An optical navigation apparatus, comprising:
    a light source unit, being configured to provide a beam of light;
    an image sensing unit, being configured to capture a first image at a first time instant when the beam of light is projected onto a reflection surface; and
    a processing unit, being electrically connected to the image sensing unit and configured to calculate an image quality index related to the first image and determine a first matching block size related to the first image and a second image according to the image quality index,
        determine whether the image quality index is greater than a first threshold,
        determine whether the first matching block size is greater than a second threshold, and
        reduce the first matching block size after determining that the image quality index is greater than the first threshold and the first matching block size is greater than the second threshold.

2. The optical navigation apparatus of claim 1, further comprising:
    a storage unit, having a correspondence table stored therein,
    wherein the processing unit determines the first matching block size by querying the correspondence table by the image quality index.

3. The optical navigation apparatus of claim 1, wherein the image sensing unit further captures the second image at a second time instant when the beam of light is projected onto the reflection surface, the second time instant is earlier than the first time instant, and the image quality index is related to a luminance variation of the first image.

4. The optical navigation apparatus of claim 3, wherein the processing unit further calculates an offset of the optical navigation apparatus by comparing the first image and the second image according to the first matching block size.

5. The optical navigation apparatus of claim 1, wherein the image sensing unit further captures the second image at a second time instant when the beam of light is projected onto the reflection surface, the second time instant is earlier than the first time instant, the processing unit further filters the first image into a filtered image, and the image quality index is related to the filtered image.

6. The optical navigation apparatus of claim 5, wherein the processing unit further calculates an offset of the optical navigation apparatus by comparing the first image and the second image according to the first matching block size.

7. The optical navigation apparatus of claim 1, wherein the image sensing unit further captures the second image at a second time instant and captures a third image at a third time instant when the beam of light is projected onto the reflection surface, the second time instant is later than the first time instant, the third time instant is earlier than first time instant, the processing unit calculates a plurality of correlation values between the first image and the third image according to a second matching block size, the image quality index is calculated by the processing unit according to the correlation values, and the processing unit further calculates an offset of the optical navigation apparatus by comparing the first image and the second image according to the first matching block size.

8. The optical navigation apparatus of claim 1, wherein the image sensing unit further captures the second image at a second time instant and captures a third image at a third time instant when the beam of light is projected onto the reflection surface, the second time instant is later than the first time instant, the third time instant is earlier than first time instant, the processing unit further calculates a first offset between the first image and the third image according to a second matching block size, the image quality index is calculated by the processing unit according to the first offset, and the processing unit further calculates a second offset of the optical navigation apparatus by comparing the first image and the second image according to the first matching block size.

9. An optical navigation apparatus, comprising:
a light source unit, being configured to provide a beam of light;
an image sensing unit, being configured to capture a first image at a first time instant when the beam of light is projected onto a reflection surface; and
a processing unit, being electrically connected to the image sensing unit and configured to calculate an image quality index related to the first image and determine a first matching block size related to the first image and a second image according to the image quality index,
when the image quality index is determined to be greater than a first threshold, increase a reduction evaluation count,
when the reduction evaluation count is determined to be greater than a second threshold, reduce the first matching block size.

10. The optical navigation apparatus of claim 9, wherein the processing unit further determines that the first matching block size is greater than a third threshold.

11. An optical navigation apparatus, comprising:
a light source unit, being configured to provide a beam of light;
an image sensing unit, being configured to capture a first image at a first time instant when the beam of light is projected onto a reflection surface; and
a processing unit, being electrically connected to the image sensing unit and configured to calculate an image quality index related to the first image and determine a first matching block size related to the first image and a second image according to the image quality index,
determine whether the image quality index is smaller than a first threshold,
determine whether the first matching block size is smaller than a second threshold, and
enlarge the first matching block size after determining that the image quality index is smaller than the first threshold and the first matching block size is smaller than the second threshold.

12. An optical navigation apparatus, comprising:
a light source unit, being configured to provide a beam of light;
an image sensing unit, being configured to capture a first image at a first time instant when the beam of light is projected onto a reflection surface; and
a processing unit, being electrically connected to the image sensing unit and configured to calculate an image quality index related to the first image and determine a first matching block size related to the first image and a second image according to the image quality index,
when the image quality index is determined to be smaller than a first threshold, increase an enlargement evaluation count,
when the enlargement evaluation count is determined to be greater than a second threshold, enlarges the first matching block size.

13. The optical navigation apparatus of claim 12, wherein the processing unit further determines that the first matching block size is smaller than a third threshold.

14. An optical navigation method, being adapted to be used in an optical navigation apparatus comprising a light source unit, an image sensing unit, and a processing unit, the optical navigation method comprising the following steps of:
capturing, by the image sensing unit, a first image at a first time instant when the light source unit projects a beam of light onto a reflection surface;
calculating, by the processing unit, an image quality index related to the first image;
determining, by the processing unit, a first matching block size related to the first image and a second image according to the image quality index;
determining, by the processing unit, whether the image quality index is greater than a first threshold;
determining, by the processing unit, whether the first matching block size is greater than a second threshold; and
reducing, by the processing unit, the first matching block size after determining that the image quality index is greater than the first threshold and the first matching block size is greater than the second threshold.

15. The optical navigation method of claim 14, further comprising the following step of:
determining, by the processing unit, the first matching block size by querying a correspondence table by the image quality index.

16. The optical navigation method of claim 14, further comprising the following step of:
capturing, by the image sensing unit, the second image at a second time instant when the beam of light is projected onto the reflection surface,
wherein the second time instant is earlier than the first time instant and the image quality index is related to a luminance variation of the first image.

17. The optical navigation method of claim 16, further comprising the following step of:
calculating, by the processing unit, an offset of the optical navigation apparatus by comparing the first image and the second image according to the first matching block size.

18. The optical navigation method of claim 14, further comprising the following steps of:
capturing, by the image sensing unit, the second image at a second time instant when the beam of light is projected onto the reflection surface, the second time instant being earlier than the first time instant; and
filtering, by the processing unit, the first image into a filtered image,
wherein the image quality index is related to the filtered image.

19. The optical navigation method of claim 18, further comprising the following step of:
calculating, by the processing unit, an offset of the optical navigation apparatus by comparing the first image and the second image according to the first matching block size.

20. The optical navigation method of claim 14, further comprising the following steps of:
capturing, by the image sensing unit, the second image at a second time instant when the beam of light is projected onto the reflection surface, the second time instant being later than the first time instant; and
capturing, by the image sensing unit, a third image at a third time instant when the beam of light is projected onto the reflection surface, the third time instant being earlier than the first time instant;
wherein the step of calculating the image quality index comprises the following steps of:
calculating, by the processing unit, a plurality of correlation values between the first image and the third image according to a second matching block size; and
determining, by the processing unit, the image quality index according to the correlation values.

21. The optical navigation method of claim 20, further comprising the following step of:
calculating, by the processing unit, an offset of the optical navigation apparatus by comparing the first image and the second image according to the first matching block size.

22. The optical navigation method of claim 14, further comprising the following steps of:
capturing, by the image sensing unit, the second image at a second time instant when the beam of light is projected onto the reflection surface, the second time instant being later than the first time instant; and
capturing, by the image sensing unit, a third image at a third time instant when the beam of light is projected onto the reflection surface, the third time instant being earlier than the first time instant,
wherein the step of calculating the image quality index comprises the following steps of:
calculating, by the processing unit, a first offset between the first image and the third image according to a second matching block size; and
determining, by the processing unit, the image quality index according to the first offset.

23. The optical navigation method of claim 22, further comprising the following step of:
calculating, by the processing unit, a second offset of the optical navigation apparatus by comparing the first image and the second image according to the first matching block size.

24. An optical navigation method, being adapted to be used in an optical navigation apparatus comprising a light source unit, an image sensing unit, and a processing unit, the optical navigation method comprising the following steps of:
capturing, by the image sensing unit, a first image at a first time instant when the light source unit projects a beam of light onto a reflection surface;
calculating, by the processing unit, an image quality index related to the first image;
determining, by the processing unit, a first matching block size related to the first image and a second image according to the image quality index;
increasing, by the processing unit, a reduction evaluation count when the image quality index is determined to be greater than a first threshold; and
reducing, by the processing unit, the first matching block size when the reduction evaluation count is determined to be greater than a second threshold.

25. The optical navigation method of claim 24, further comprising the following step of:
determining, by the processing unit, that the first matching block size is greater than a third threshold.

26. An optical navigation method, being adapted to be used in an optical navigation apparatus comprising a light source unit, an image sensing unit, and a processing unit, the optical navigation method comprising the following steps of:
capturing, by the image sensing unit, a first image at a first time instant when the light source unit projects a beam of light onto a reflection surface;
calculating, by the processing unit, an image quality index related to the first image;
determining, by the processing unit, a first matching block size related to the first image and a second image according to the image quality index;
determining, by the processing unit, whether the image quality index is smaller than a first threshold;
determining, by the processing unit, whether the first matching block size is smaller than a second threshold; and
enlarging, by the processing unit, the first matching block size after determining that the image quality index is smaller than the first threshold and the first matching block size is smaller than the second threshold.

27. An optical navigation method, being adapted to be used in an optical navigation apparatus comprising a light source unit, an image sensing unit, and a processing unit, the optical navigation method comprising the following steps of:
capturing, by the image sensing unit, a first image at a first time instant when the light source unit projects a beam of light onto a reflection surface;
calculating, by the processing unit, an image quality index related to the first image;
determining, by the processing unit, a first matching block size related to the first image and a second image according to the image quality index;
increasing, by the processing unit, an enlargement evaluation count when the image quality index is determined to be smaller than a first threshold; and
enlarging, by the processing unit, the first matching block size when the enlargement evaluation count is greater than a second threshold.

28. The optical navigation method of claim 27, further comprising the following step of:
determining, by the processing unit, that the first matching block size is smaller than a third threshold.

29. A non-transitory computer readable medium, having a computer program stored therein, the computer program executing an optical navigation method after being loaded into an optical navigation apparatus, the optical navigation apparatus comprising a light source unit, an image sensing unit, and a processing unit, and the computer program comprising:
code A for capturing a first image at a time instant by the image sensing unit when the light source unit projects a beam of light onto a reflection surface;
code B for calculating an image quality index related to the first image by the processing unit;
code C for determining a matching block size related to the first image and a second image according to the image quality index;
code D for determining whether the image quality index is greater than a first threshold;

code E, for determining whether the matching block size is greater than a second threshold;

code F for reducing the matching block size after determining that the image quality index is greater than the first threshold and the matching block size is greater than the second threshold.

30. A non-transitory computer readable medium, having a computer program stored therein, the computer program executing an optical navigation method after being loaded into an optical navigation apparatus, the optical navigation apparatus comprising a light source unit, an image sensing unit, and a processing unit, and the computer program comprising:

code A for capturing a first image at a time instant by the image sensing unit when the light source unit projects a beam of light onto a reflection surface;

code B for calculating an image quality index related to the first image by the processing unit;

code C for determining a matching block size related to the first image and a second image according to the image quality index;

code D for increasing a reduction evaluation count when the image quality index is determined to be greater than a first threshold; and code E for reducing the matching block size when the reduction evaluation count is determined to be greater than a second threshold.

31. A non-transitory computer readable medium, having a computer program stored therein, the computer program executing an optical navigation method after being loaded into an optical navigation apparatus, the optical navigation apparatus comprising a light source unit, an image sensing unit, and a processing unit, and the computer program comprising:

code A for capturing a first image at a time instant by the image sensing unit when the light source unit projects a beam of light onto a reflection surface;

code B for calculating an image quality index related to the first image by the processing unit;

code C for determining a matching block size related to the first image and a second image according to the image quality index;

code D for determining whether the image quality index is smaller than a first threshold;

code E for determining whether the matching block size is smaller than a second threshold; and code F for enlarging the matching block size after determining that the image quality index is smaller than the first threshold and the matching block size is smaller than the second threshold.

32. A non-transitory computer readable medium, having a computer program stored therein, the computer program executing an optical navigation method after being loaded into an optical navigation apparatus, the optical navigation apparatus comprising a light source unit, an image sensing unit, and a processing unit, and the computer program comprising:

code A for capturing a first image at a time instant by the image sensing unit when the light source unit projects a beam of light onto a reflection surface;

code B for calculating an image quality index related to the first image by the processing unit;

code C for determining a matching block size related to the first image and a second image according to the image quality index;

code D for increasing an enlargement evaluation count when the image quality index is determined to be smaller than a first threshold; and code E for enlarging, by the processing unit, the matching block size when the enlargement evaluation count is greater than a second threshold.

* * * * *